US012645495B2

(12) United States Patent
Kan et al.

(10) Patent No.: US 12,645,495 B2
(45) Date of Patent: *Jun. 2, 2026

(54) TECHNIQUES FOR BEHAVIORAL PAIRING IN A TASK ASSIGNMENT SYSTEM

(71) Applicant: Afiniti AI Limited, Dublin (IE)

(72) Inventors: Ittai Kan, McLean, VA (US); Zia Chishti, San Juan, PR (US); Vikash Khatri, Alexandria, VA (US); James Edward Elmore, Washington, DC (US)

(73) Assignee: Afiniti AI Limited, Dublin (IE)

( * ) Notice: Subject to any disclaimer, the term of this patent is extended or adjusted under 35 U.S.C. 154(b) by 16 days.

This patent is subject to a terminal disclaimer.

(21) Appl. No.: 18/428,544

(22) Filed: Jan. 31, 2024

(65) Prior Publication Data

US 2024/0248756 A1      Jul. 25, 2024

Related U.S. Application Data

(63) Continuation of application No. 17/150,204, filed on Jan. 15, 2021, now Pat. No. 11,915,042, which is a
(Continued)

(51) Int. Cl.
    *G06F 9/48*          (2006.01)
    *G06F 9/455*         (2018.01)
    (Continued)

(52) U.S. Cl.
    CPC ............ *G06F 9/4881* (2013.01); *G06F 9/455* (2013.01); *G06F 9/48* (2013.01); *G06F 9/4806* (2013.01);
    (Continued)

(58) Field of Classification Search
    CPC .......... G06F 9/455; G06F 9/48; G06F 9/4806; G06F 9/4843; G06F 9/485; G06F 9/4856;
    (Continued)

(56) References Cited

U.S. PATENT DOCUMENTS

| | | | |
|---|---|---|---|
| 5,155,763 A | 10/1992 | Bigus et al. | |
| 5,206,903 A | 4/1993 | Kohler et al. | |
| | (Continued) | | |

FOREIGN PATENT DOCUMENTS

| | | | |
|---|---|---|---|
| AU | 2008349500 C1 | 5/2014 | |
| AU | 2009209317 B2 | 5/2014 | |
| | (Continued) | | |

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 2016, (11 pages).
(Continued)

*Primary Examiner* — Charles M Swift
(74) *Attorney, Agent, or Firm* — Rothwell, Figg, Ernst & Manbeck, P.C.

(57)          ABSTRACT

Techniques for behavioral pairing in a task assignment system are disclosed. In one particular embodiment, the techniques may be realized as a method for behavioral pairing in a task assignment system comprising: determining, by at least one computer processor communicatively coupled to and configured to operate in the task assignment system, a priority for each of a plurality of tasks; determining, by the at least one computer processor, an agent available for assignment to any of the plurality of tasks; and assigning, by the at least one computer processor, a first task of the plurality of tasks to the agent using a task assignment strategy, wherein the first task has a lower-priority than a second task of the plurality of tasks.

18 Claims, 2 Drawing Sheets

Task Assignment Method
200

Related U.S. Application Data continuation of application No. 16/717,724, filed on Dec. 17, 2019, now Pat. No. 11,269,682, which is a continuation of application No. 15/837,911, filed on Dec. 11, 2017, now Pat. No. 10,509,671.

(51) Int. Cl.

| | |
|---|---|
| *G06F 9/50* | (2006.01) |
| *G06Q 10/0631* | (2023.01) |
| *H04M 3/51* | (2006.01) |
| *H04M 3/52* | (2006.01) |
| *H04M 3/523* | (2006.01) |

(52) U.S. Cl.

CPC ............ *G06F 9/4843* (2013.01); *G06F 9/485* (2013.01); *G06F 9/4856* (2013.01); *G06F 9/50* (2013.01); *G06F 9/5005* (2013.01); *G06F 9/5027* (2013.01); *G06F 9/5038* (2013.01); *G06F 9/5061* (2013.01); *G06F 9/5083* (2013.01); *G06Q 10/06311* (2013.01); *H04M 3/51* (2013.01); *H04M 3/523* (2013.01); *H04M 3/5238* (2013.01); *G06F 2209/5021* (2013.01)

(58) Field of Classification Search

CPC ........ G06F 9/4881; G06F 9/50; G06F 9/5005; G06F 9/5027; G06F 9/5038; G06F 9/5061; G06F 9/5083; H04M 3/51; H04M 3/523

See application file for complete search history.

(56) References Cited

U.S. PATENT DOCUMENTS

| | | | |
|---|---|---|---|
| 5,327,490 | A | 7/1994 | Cave |
| 5,537,470 | A | 7/1996 | Lee |
| 5,702,253 | A | 12/1997 | Bryce et al. |
| 5,825,869 | A | 10/1998 | Brooks et al. |
| 5,903,641 | A | 5/1999 | Tonisson |
| 5,907,601 | A | 5/1999 | David et al. |
| 5,926,538 | A | 7/1999 | Deryugin et al. |
| 6,044,355 | A | 3/2000 | Crockett et al. |
| 6,049,603 | A | 4/2000 | Schwartz et al. |
| 6,052,460 | A | 4/2000 | Fisher et al. |
| 6,064,731 | A | 5/2000 | Flockhart et al. |
| 6,088,444 | A | 7/2000 | Walker et al. |
| 6,163,607 | A | 12/2000 | Bogart et al. |
| 6,222,919 | B1 | 4/2001 | Hollatz et al. |
| 6,292,555 | B1 | 9/2001 | Okamoto |
| 6,324,282 | B1 | 11/2001 | McIllwaine et al. |
| 6,333,979 | B1 | 12/2001 | Bondi et al. |
| 6,389,132 | B1 | 5/2002 | Price |
| 6,389,400 | B1 | 5/2002 | Bushey et al. |
| 6,408,066 | B1 | 6/2002 | Andruska et al. |
| 6,411,687 | B1 | 6/2002 | Bohacek et al. |
| 6,424,709 | B1 | 7/2002 | Doyle et al. |
| 6,434,230 | B1 | 8/2002 | Gabriel |
| 6,493,446 | B1 | 12/2002 | Cherry |
| 6,496,580 | B1 | 12/2002 | Chack |
| 6,504,920 | B1 | 1/2003 | Okon et al. |
| 6,519,335 | B1 | 2/2003 | Bushnell |
| 6,519,568 | B1 | 2/2003 | Harvey et al. |
| 6,535,600 | B1 | 3/2003 | Fisher et al. |
| 6,535,601 | B1 | 3/2003 | Flockhart et al. |
| 6,570,980 | B1 | 5/2003 | Baruch |
| 6,587,556 | B1 | 7/2003 | Judkins et al. |
| 6,603,854 | B1 | 8/2003 | Judkins et al. |
| 6,639,976 | B1 | 10/2003 | Shellum et al. |
| 6,661,889 | B1 | 12/2003 | Flockhart et al. |
| 6,704,410 | B1 | 3/2004 | McFarlane et al. |
| 6,707,904 | B1 | 3/2004 | Judkins et al. |
| 6,714,643 | B1 | 3/2004 | Gargeya et al. |
| 6,744,878 | B1 | 6/2004 | Komissarchik et al. |

| | | | |
|---|---|---|---|
| 6,757,897 | B1 | 6/2004 | Shi et al. |
| 6,763,104 | B1 | 7/2004 | Judkins et al. |
| 6,774,932 | B1 | 8/2004 | Ewing et al. |
| 6,775,378 | B1 | 8/2004 | Villena et al. |
| 6,798,876 | B1 | 9/2004 | Bala |
| 6,829,348 | B1 | 12/2004 | Schroeder et al. |
| 6,832,203 | B1 | 12/2004 | Villena et al. |
| 6,859,529 | B2 | 2/2005 | Duncan et al. |
| 6,895,083 | B1 | 5/2005 | Bers et al. |
| 6,922,466 | B1 | 7/2005 | Peterson et al. |
| 6,937,715 | B2 | 8/2005 | Delaney |
| 6,956,941 | B1 | 10/2005 | Duncan et al. |
| 6,970,821 | B1 | 11/2005 | Shambaugh et al. |
| 6,978,006 | B1 | 12/2005 | Polcyn |
| 7,023,979 | B1 | 4/2006 | Wu et al. |
| 7,039,166 | B1 | 5/2006 | Peterson et al. |
| 7,050,566 | B2 | 5/2006 | Becerra et al. |
| 7,050,567 | B1 | 5/2006 | Jensen |
| 7,062,031 | B2 | 6/2006 | Becerra et al. |
| 7,068,775 | B1 | 6/2006 | Lee |
| 7,092,509 | B1 | 8/2006 | Mears et al. |
| 7,103,172 | B2 | 9/2006 | Brown et al. |
| 7,158,628 | B2 | 1/2007 | McConnell et al. |
| 7,184,540 | B2 | 2/2007 | Dezonno et al. |
| 7,209,549 | B2 | 4/2007 | Reynolds et al. |
| 7,231,032 | B2 | 6/2007 | Nevman et al. |
| 7,231,034 | B1 | 6/2007 | Rikhy et al. |
| 7,236,584 | B2 | 6/2007 | Torba |
| 7,245,716 | B2 | 7/2007 | Brown et al. |
| 7,245,719 | B2 | 7/2007 | Kawada et al. |
| 7,266,251 | B2 | 9/2007 | Rowe |
| 7,269,253 | B1 | 9/2007 | Wu et al. |
| 7,353,388 | B1 | 4/2008 | Gilman et al. |
| 7,372,952 | B1 | 5/2008 | Wu et al. |
| 7,398,224 | B2 | 7/2008 | Cooper |
| 7,593,521 | B2 | 9/2009 | Becerra et al. |
| 7,676,034 | B1 | 3/2010 | Wu et al. |
| 7,689,998 | B1 | 3/2010 | Chrysanthakopoulos |
| 7,725,339 | B1 | 5/2010 | Aykin |
| 7,734,032 | B1 | 6/2010 | Kiefhaber et al. |
| 7,798,876 | B2 | 9/2010 | Mix |
| 7,826,597 | B2 | 11/2010 | Berner et al. |
| 7,864,944 | B2 | 1/2011 | Khouri et al. |
| 7,899,177 | B1 | 3/2011 | Bruening et al. |
| 7,916,858 | B1 | 3/2011 | Heller et al. |
| 7,940,917 | B2 | 5/2011 | Lauridsen et al. |
| 7,961,866 | B1 | 6/2011 | Boutcher et al. |
| 7,995,717 | B2 | 8/2011 | Conway et al. |
| 8,000,989 | B1 | 8/2011 | Kiefhaber et al. |
| 8,010,607 | B2 | 8/2011 | McCormack et al. |
| 8,094,790 | B2 | 1/2012 | Conway et al. |
| 8,126,133 | B1 | 2/2012 | Everingham et al. |
| 8,140,441 | B2 | 3/2012 | Cases et al. |
| 8,175,253 | B2 | 5/2012 | Knott et al. |
| 8,229,102 | B2 | 7/2012 | Knott et al. |
| 8,249,245 | B2 | 8/2012 | Jay et al. |
| 8,295,471 | B2 | 10/2012 | Spottiswoode et al. |
| 8,300,798 | B1 | 10/2012 | Wu et al. |
| 8,306,212 | B2 | 11/2012 | Arora |
| 8,359,219 | B2 | 1/2013 | Chishti et al. |
| 8,396,205 | B1 * | 3/2013 | Lowry ............... H04M 3/5175 |
| | | | 379/265.06 |
| 8,433,597 | B2 | 4/2013 | Chishti et al. |
| 8,472,611 | B2 | 6/2013 | Chishti |
| 8,565,410 | B2 | 10/2013 | Chishti et al. |
| 8,634,542 | B2 | 1/2014 | Spottiswoode et al. |
| 8,644,490 | B2 | 2/2014 | Stewart |
| 8,670,548 | B2 | 3/2014 | Xie et al. |
| 8,699,694 | B2 | 4/2014 | Chishti et al. |
| 8,712,821 | B2 | 4/2014 | Spottiswoode |
| 8,718,271 | B2 | 5/2014 | Spottiswoode |
| 8,724,797 | B2 | 5/2014 | Chishti et al. |
| 8,731,178 | B2 | 5/2014 | Chishti et al. |
| 8,737,595 | B2 | 5/2014 | Chishti et al. |
| 8,750,488 | B2 | 6/2014 | Spottiswoode et al. |
| 8,761,380 | B2 | 6/2014 | Kohler et al. |
| 8,781,100 | B2 | 7/2014 | Spottiswoode et al. |
| 8,781,106 | B2 | 7/2014 | Afzal |
| 8,792,630 | B2 | 7/2014 | Chishti et al. |

(56) References Cited

U.S. PATENT DOCUMENTS

| | | | |
|---|---|---|---|
| 8,824,658 B2 | 9/2014 | Chishti | |
| 8,831,207 B1 | 9/2014 | Agarwal | |
| 8,856,869 B1 | 10/2014 | Brinskelle | |
| 8,879,715 B2* | 11/2014 | Spottiswoode | H04M 3/5191 |
| | | | 379/265.06 |
| 8,903,079 B2 | 12/2014 | Xie et al. | |
| 8,913,736 B2 | 12/2014 | Kohler et al. | |
| 8,929,537 B2 | 1/2015 | Chishti et al. | |
| 8,938,063 B1 | 1/2015 | Hackbarth et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,215,323 B2 | 12/2015 | Chishti | |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 9,712,676 B1 | 7/2017 | Chishti | |
| 9,712,679 B2 | 7/2017 | Chishti et al. | |
| 9,781,269 B2 | 10/2017 | Chishti et al. | |
| 9,787,841 B2 | 10/2017 | Chishti et al. | |
| 9,930,180 B1 | 3/2018 | Kan et al. | |
| 9,942,405 B1 | 4/2018 | Kan et al. | |
| RE46,986 E | 8/2018 | Chishti et al. | |
| 10,116,800 B1 | 10/2018 | Kan et al. | |
| 10,135,987 B1 | 11/2018 | Chishti et al. | |
| RE47,201 E | 1/2019 | Chishti et al. | |
| 10,284,727 B2 | 5/2019 | Kan et al. | |
| 10,404,861 B2 | 9/2019 | Kan et al. | |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0059029 A1 | 3/2003 | Mengshoel et al. | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0015973 A1 | 1/2004 | Skovira | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0013428 A1 | 1/2005 | Walters | |
| 2005/0043986 A1 | 2/2005 | McConnell et al. | |
| 2005/0047581 A1 | 3/2005 | Shaffer et al. | |
| 2005/0047582 A1 | 3/2005 | Shaffer et al. | |
| 2005/0071223 A1 | 3/2005 | Jain et al. | |
| 2005/0097556 A1 | 5/2005 | Code et al. | |
| 2005/0129212 A1 | 6/2005 | Parker | |
| 2005/0135593 A1 | 6/2005 | Becerra et al. | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0201547 A1 | 9/2005 | Burg et al. | |
| 2005/0286709 A1 | 12/2005 | Horton et al. | |
| 2006/0037021 A1 | 2/2006 | Anand et al. | |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1 | 10/2006 | Contractor et al. | |
| 2006/0233346 A1 | 10/2006 | McIlwaine et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1* | 3/2007 | Flockhart | H04M 3/5233 |
| | | | 379/265.02 |
| 2007/0121602 A1 | 5/2007 | Sin et al. | |
| 2007/0121829 A1 | 5/2007 | Tal et al. | |
| 2007/0127690 A1 | 6/2007 | Patakula et al. | |
| 2007/0136342 A1 | 6/2007 | Singhai et al. | |
| 2007/0153996 A1 | 7/2007 | Hansen | |
| 2007/0154007 A1 | 7/2007 | Bernhard | |
| 2007/0174111 A1 | 7/2007 | Anderson et al. | |
| 2007/0198322 A1 | 8/2007 | Bourne et al. | |
| 2007/0211881 A1 | 9/2007 | Parker-Stephen | |
| 2007/0219816 A1 | 9/2007 | Van Luchene et al. | |
| 2007/0274502 A1 | 11/2007 | Brown | |
| 2008/0002823 A1 | 1/2008 | Fama et al. | |
| 2008/0008309 A1 | 1/2008 | Dezonno et al. | |
| 2008/0046386 A1 | 2/2008 | Pieraccinii et al. | |
| 2008/0065476 A1 | 3/2008 | Klein et al. | |
| 2008/0118052 A1 | 5/2008 | Houmaidi et al. | |
| 2008/0147470 A1 | 6/2008 | Johri et al. | |
| 2008/0152122 A1 | 6/2008 | Idan et al. | |
| 2008/0181389 A1 | 7/2008 | Bourne et al. | |
| 2008/0199000 A1 | 8/2008 | Su et al. | |
| 2008/0205611 A1 | 8/2008 | Jordan et al. | |
| 2008/0222640 A1 | 9/2008 | Daly et al. | |
| 2008/0267386 A1 | 10/2008 | Cooper | |
| 2008/0273687 A1 | 11/2008 | Knott et al. | |
| 2009/0031312 A1 | 1/2009 | Mausolf et al. | |
| 2009/0043670 A1 | 2/2009 | Johansson et al. | |
| 2009/0086933 A1 | 4/2009 | Patel et al. | |
| 2009/0158299 A1 | 6/2009 | Carter | |
| 2009/0190740 A1 | 7/2009 | Chishti et al. | |
| 2009/0190743 A1 | 7/2009 | Spottiswoode | |
| 2009/0190744 A1 | 7/2009 | Xie et al. | |
| 2009/0190745 A1 | 7/2009 | Xie et al. | |
| 2009/0190746 A1 | 7/2009 | Chishti et al. | |
| 2009/0190747 A1 | 7/2009 | Spottiswoode | |
| 2009/0190748 A1 | 7/2009 | Chishti et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2009/0245493 A1 | 10/2009 | Chen et al. | |
| 2009/0254774 A1 | 10/2009 | Chamdani et al. | |
| 2009/0304172 A1 | 12/2009 | Becerra et al. | |
| 2009/0318111 A1 | 12/2009 | Desai et al. | |
| 2009/0323921 A1 | 12/2009 | Spottiswoode et al. | |
| 2010/0020959 A1 | 1/2010 | Spottiswoode | |
| 2010/0020961 A1 | 1/2010 | Spottiswoode | |
| 2010/0054431 A1 | 3/2010 | Jaiswal et al. | |
| 2010/0054452 A1 | 3/2010 | Afzal | |
| 2010/0054453 A1 | 3/2010 | Stewart | |
| 2010/0086120 A1 | 4/2010 | Brussat et al. | |
| 2010/0111285 A1 | 5/2010 | Chishti | |
| 2010/0111286 A1 | 5/2010 | Chishti | |
| 2010/0111287 A1 | 5/2010 | Xie | |
| 2010/0111288 A1 | 5/2010 | Afzal et al. | |
| 2010/0142689 A1 | 6/2010 | Hansen et al. | |
| 2010/0142698 A1 | 6/2010 | Spottiswoode et al. | |
| 2010/0158238 A1 | 6/2010 | Saushkin | |
| 2010/0183138 A1 | 7/2010 | Spottiswoode et al. | |
| 2011/0022357 A1 | 1/2011 | Vock et al. | |
| 2011/0026468 A1* | 2/2011 | Conrad | H04M 15/8044 |
| | | | 455/445 |
| 2011/0031112 A1 | 2/2011 | Birang et al. | |
| 2011/0069821 A1 | 3/2011 | Korolev et al. | |
| 2011/0125048 A1 | 5/2011 | Causevic et al. | |
| 2011/0173329 A1 | 7/2011 | Zhang et al. | |
| 2012/0051536 A1 | 3/2012 | Chishti et al. | |
| 2012/0051537 A1* | 3/2012 | Chishti | H04M 3/5233 |
| | | | 379/265.11 |
| 2012/0183131 A1 | 7/2012 | Kohler et al. | |
| 2012/0224680 A1 | 9/2012 | Spottiswoode et al. | |

(56) References Cited

U.S. PATENT DOCUMENTS

| | | | |
|---|---|---|---|
| 2012/0224681 A1* | 9/2012 | Desai | H04M 3/5166 |
| | | | 379/266.1 |
| 2012/0233623 A1 | 9/2012 | van Riel | |
| 2012/0278136 A1 | 11/2012 | Flockhart et al. | |
| 2013/0003959 A1 | 1/2013 | Nishikawa et al. | |
| 2013/0051545 A1 | 2/2013 | Ross et al. | |
| 2013/0074088 A1 | 3/2013 | Purcell et al. | |
| 2013/0111009 A1 | 5/2013 | Sng et al. | |
| 2013/0198039 A1 | 8/2013 | Sridharan et al. | |
| 2013/0251137 A1 | 9/2013 | Chishti et al. | |
| 2013/0287202 A1 | 10/2013 | Flockhart et al. | |
| 2014/0044246 A1 | 2/2014 | Klemm et al. | |
| 2014/0079210 A1 | 3/2014 | Kohler et al. | |
| 2014/0119531 A1 | 5/2014 | Tuchman et al. | |
| 2014/0119533 A1 | 5/2014 | Spottiswoode et al. | |
| 2014/0161249 A1 | 6/2014 | Tolksdorf | |
| 2014/0169549 A1 | 6/2014 | Desai et al. | |
| 2014/0254776 A1* | 9/2014 | O'Connor | H04M 3/5175 |
| | | | 379/265.06 |
| 2014/0325524 A1 | 10/2014 | Zangaro et al. | |
| 2014/0341370 A1 | 11/2014 | Li et al. | |
| 2015/0055772 A1 | 2/2015 | Klemm et al. | |
| 2015/0103999 A1 | 4/2015 | Nowak et al. | |
| 2015/0106819 A1 | 4/2015 | Kim et al. | |
| 2015/0237211 A1 | 8/2015 | Chishti et al. | |
| 2015/0268992 A1 | 9/2015 | Fan | |
| 2015/0281448 A1 | 10/2015 | Putra et al. | |
| 2016/0062797 A1 | 3/2016 | Holt et al. | |
| 2016/0080573 A1 | 3/2016 | Chishti | |
| 2016/0330324 A1 | 11/2016 | Srinivas et al. | |
| 2017/0064080 A1 | 3/2017 | Chishti et al. | |
| 2017/0064081 A1 | 3/2017 | Chishti et al. | |
| 2017/0109206 A1 | 4/2017 | Wang et al. | |

FOREIGN PATENT DOCUMENTS

| | | | |
|---|---|---|---|
| AU | 2009311534 B2 | 8/2014 | |
| CN | 102301688 B | 5/2014 | |
| CN | 102017591 B | 11/2014 | |
| EP | 0493292 A2 | 7/1992 | |
| EP | 0949793 A1 | 10/1999 | |
| EP | 1032188 A1 | 8/2000 | |
| EP | 1335572 A2 | 8/2003 | |
| JP | 11-098252 A | 4/1999 | |
| JP | 2000-069168 A | 3/2000 | |
| JP | 2000-078291 A | 3/2000 | |
| JP | 2000-078292 A | 3/2000 | |
| JP | 2000-092213 A | 3/2000 | |
| JP | 2000-236393 A | 8/2000 | |
| JP | 2001-217939 A | 8/2001 | |
| JP | 2001-292236 A | 10/2001 | |
| JP | 2001-518753 A | 10/2001 | |
| JP | 2002-297900 A | 10/2002 | |
| JP | 3366565 B2 | 1/2003 | |
| JP | 2003-187061 A | 7/2003 | |
| JP | 2004-056517 A | 2/2004 | |
| JP | 2004-227228 A | 8/2004 | |
| JP | 2006-345132 A | 12/2006 | |
| JP | 2007-324708 A | 12/2007 | |
| JP | 2011-511533 A | 4/2011 | |
| JP | 2011-511536 A | 4/2011 | |
| JP | 2012-075146 A | 4/2012 | |
| JP | 5421928 B2 | 2/2014 | |
| JP | 5631326 B2 | 11/2014 | |
| JP | 5649575 B2 | 1/2015 | |
| JP | 2015-514371 A | 5/2015 | |
| MX | 316118 | 12/2013 | |
| MX | 322251 | 7/2014 | |
| NZ | 587100 B | 10/2013 | |
| NZ | 587101 B | 10/2013 | |
| NZ | 591486 B | 1/2014 | |
| NZ | 592781 B | 3/2014 | |
| PH | 1-2010-501704 | 2/2014 | |
| PH | 1-2010-501705 | 2/2015 | |

| | | | |
|---|---|---|---|
| WO | WO-1999/17517 A1 | 4/1999 | |
| WO | WO-2001/063894 A2 | 8/2001 | |
| WO | WO-2006/124113 A2 | 11/2006 | |
| WO | WO-2009/097018 A1 | 8/2009 | |
| WO | WO-2010/053701 A2 | 5/2010 | |
| WO | WO-2011/081514 A1 | 7/2011 | |

OTHER PUBLICATIONS

Anonymous. (2006) "Performance Based Routing in Profit Call Centers," The Decision Makers' Direct, located at www.decisioncraft. com, Issue Jun. 2002 (3 pages).

Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).

Cleveland, William S., "Robust Locally Weighted Regression and Smoothing Scatterplots," Journal of the American Statistical Association, vol. 74, No. 368, Dec. 1979, pp. 829-836 (8 pages).

Cormen, T. H., et al., "Introduction to Algorithms," 3rd Edition, Chapter 26 Maximum Flow, pp. 708-768 and Chapter 29 Linear Programming, pp. 843-897 (2009).

Gans, N. et al., "Telephone Call Centers: Tutorial, Review and Research Prospects," Manufacturing & Service Operations Management, vol. 5, No. 2, 2003, pp. 79-141, (84 pages).

International Preliminary Report on Patentability and Written Opinion issued in connection with PCT/US2009/066254 dated Jun. 14, 2011, (6 pages).

International Search Report and Written Opinion issued in connection with PCT/IB2018/000886 dated Dec. 4, 2018, (13 pages).

International Search Report and Written Opinion issued in connection with PCT/IB2018/000907 dated Nov. 26, 2018, (11 pages).

International Search Report issued in connection with PCT/US/2009/054352 dated Mar. 12, 2010. (5 pages).

International Search Report issued in connection with PCT/US2008/077042 dated Mar. 13, 2009, (3 pages).

International Search Report issued in connection with PCT/US2009/031611 dated Jun. 3, 2009, (5 pages).

International Search Report issued in connection with PCT/US2009/061537 dated Jun. 7, 2010, (5 pages).

International Search Report issued in connection with PCT/US2009/066254 dated Feb. 24, 2010, (4 pages).

International Search Report issued in connection with PCT/US2013/033261 dated Jun. 14, 2013, (3 pages).

International Search Report issued in connection with PCT/US2013/033265 dated Jul. 9, 2013, (2 pages).

International Search Report issued in connection with PCT/US2013/033268 dated May 31, 2013, (2 pages).

Ioannis Ntzoufras "Bayesian Modeling Using Winbugs An Introduction", Department of Statistics, Athens University of Economics and Business, Wiley-Interscience, A John Wiley & Sons, Inc., Publication, Chapter 5, Jan. 1, 2007, pp. 155-220 (67 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Nocedal, J. and Wright, S. J., "Numerical Optimization," Chapter 16 Quadratic Programming, pp. 448-496 (2006) 50 pages.

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

(56)     References Cited

OTHER PUBLICATIONS

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Written Opinion of the International Searching Authority Issued in connection with PCT/US/2009/054352 dated Mar. 12, 2010, (5 pages).

Written Opinion of the International Searching Authority issued in connection with PCT/US2008/077042 dated Mar. 13, 2009, (6 pages).

Written Opinion of the International Searching Authority issued in connection with PCT/US2009/031611 dated Jun. 3, 2009, (7 pages).

Written Opinion of the International Searching Authority issued in connection with PCT/US2009/061537 dated Jun. 7, 2010, (10 pages).

Written Opinion of the International Searching Authority issued in connection with PCT/US2009/066254 dated Feb. 24, 2010, (5 pages).

Written Opinion of the International Searching Authority issued in connection with PCT/US2013/033261 dated Jun. 14, 2013, (7 pages).

Written Opinion of the International Searching Authority issued in connection with PCT/US2013/033265 dated Jul. 9, 2013, (7 pages).

Written Opinion of the International Searching Authority issued in connection with PCT/US2013/033268 dated May 31, 2013, (7 pages).

* cited by examiner

Task Assignment System
100

Task Assignment Method
200

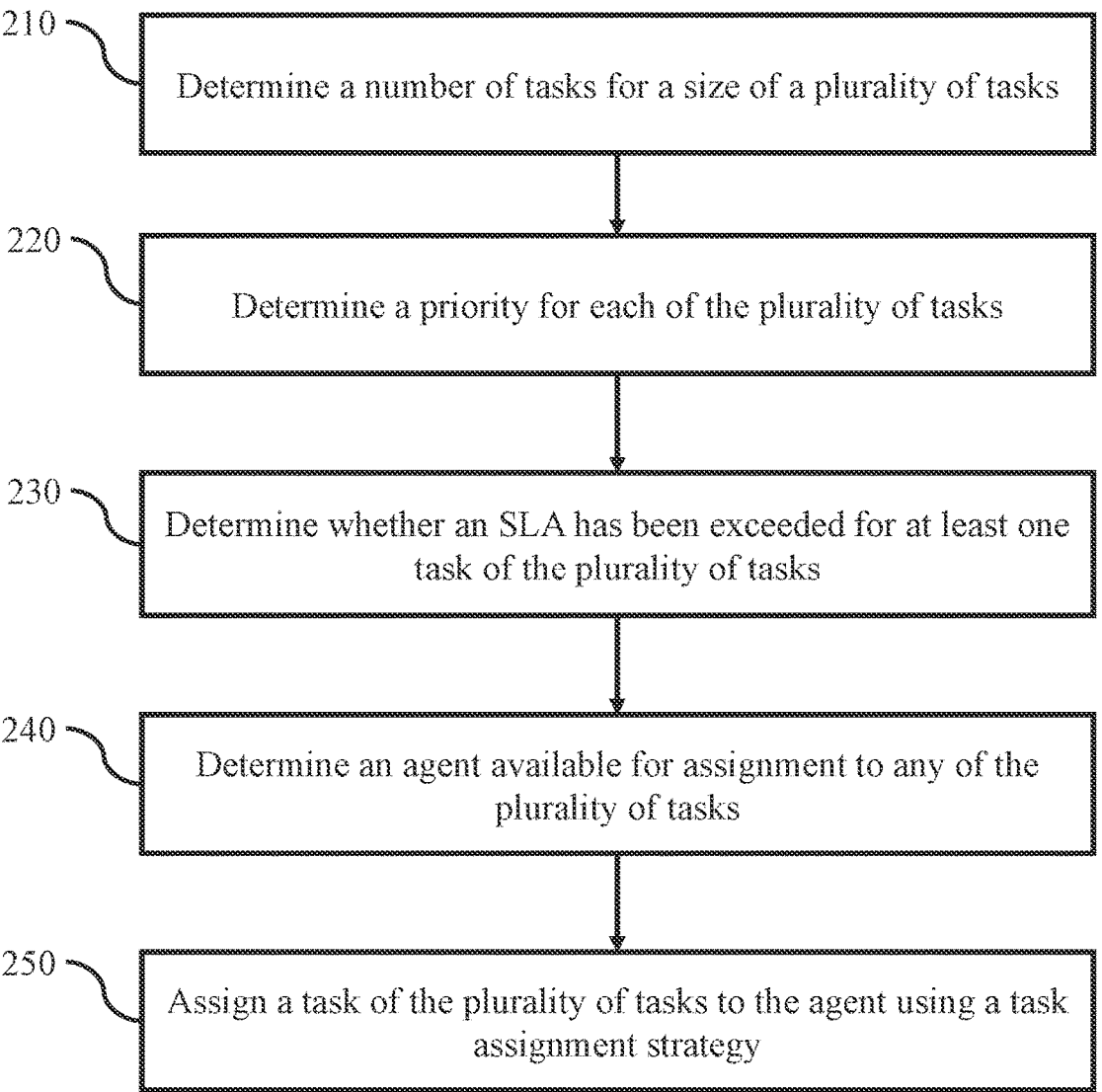

210 — Determine a number of tasks for a size of a plurality of tasks

220 — Determine a priority for each of the plurality of tasks

230 — Determine whether an SLA has been exceeded for at least one task of the plurality of tasks 240 — Determine an agent available for assignment to any of the plurality of tasks 250 — Assign a task of the plurality of tasks to the agent using a task assignment strategy

FIG. 2

TECHNIQUES FOR BEHAVIORAL PAIRING IN A TASK ASSIGNMENT SYSTEM

CROSS-REFERENCE TO RELATED APPLICATIONS

This application is a continuation of U.S. patent application Ser. No. 17/150,204, filed on Jan. 15, 2021, which is a continuation of U.S. patent application Ser. No. 16/717,724, filed on Dec. 17, 2019 (now U.S. Pat. No. 11,269,682), which is a continuation of U.S. patent application Ser. No. 15/837,911, filed on Dec. 11, 2017 (now U.S. Pat. No. 10,509,671). The disclosures of each of the identified applications are incorporated herein by reference in their entirety.

FIELD OF THE DISCLOSURE

The present disclosure generally relates to behavioral pairing and, more particularly, to techniques for behavioral pairing in a task assignment system.

BACKGROUND OF THE DISCLOSURE

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks will be assigned ahead of low-priority tasks. In some situations, some low-priority tasks may have a high average waiting time while high-priority tasks are handled instead. Moreover, agents that might have handled low-priority tasks more efficiently may end up being assigned to high-priority tasks instead, leading to suboptimal overall performance in the task assignment system.

In view of the foregoing, it may be understood that there may be a need for a system that efficiently optimizes the application of a BP strategy in L2 environments of a task assignment system.

SUMMARY OF THE DISCLOSURE

Techniques for behavioral pairing in a task assignment system are disclosed. In one particular embodiment, the techniques may be realized as a method for behavioral pairing in a task assignment system comprising determining, by at least one computer processor communicatively coupled to and configured to operate in the task assignment system, a priority for each of a plurality of tasks; determining, by the at least one computer processor, an agent available for assignment to any of the plurality of tasks; and assigning, by the at least one computer processor, a first task of the plurality of tasks to the agent using a task assignment strategy, wherein the first task has a lower-priority than a second task of the plurality of tasks.

In accordance with other aspects of this particular embodiment, the first plurality of tasks may comprise a number of tasks from a front of a queue of tasks.

In accordance with other aspects of this particular embodiment, the number of tasks is greater than one and less than ten.

In accordance with other aspects of this particular embodiment, the method may further comprise determining, by the at least one computer processor, an optimal degree of choice for the task assignment strategy, and determining, by the at least one computer processor, the number of tasks based on the optimal degree of choice.

In accordance with other aspects of this particular embodiment, the number of tasks may be proportional to a size of the queue of tasks.

In accordance with other aspects of this particular embodiment, the number of tasks may be proportional to relative numbers of tasks of different priorities.

In accordance with other aspects of this particular embodiment, the method may further comprise determining, by the at least one computer processor, that the first task of the plurality of tasks has exceeded a relevant service level agreement.

In accordance with other aspects of this particular embodiment, the service level agreement may be a function of an estimated wait time for the first task.

In accordance with other aspects of this particular embodiment, the first plurality of tasks may comprise a number of tasks from a front of a queue of tasks, and wherein the service level agreement may be a function of the number of tasks.

In accordance with other aspects of this particular embodiment, at least one of the plurality of tasks may be a virtual task.

In accordance with other aspects of this particular embodiment, the task assignment strategy may be a behavioral pairing strategy.

In another particular embodiment, the techniques may be realized as a system for behavioral pairing in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for behavioral pairing in a task assignment system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

FIG. 2 shows a flow diagram of a task assignment method according to embodiments of the present disclosure.

DETAILED DESCRIPTION

Figure 1:
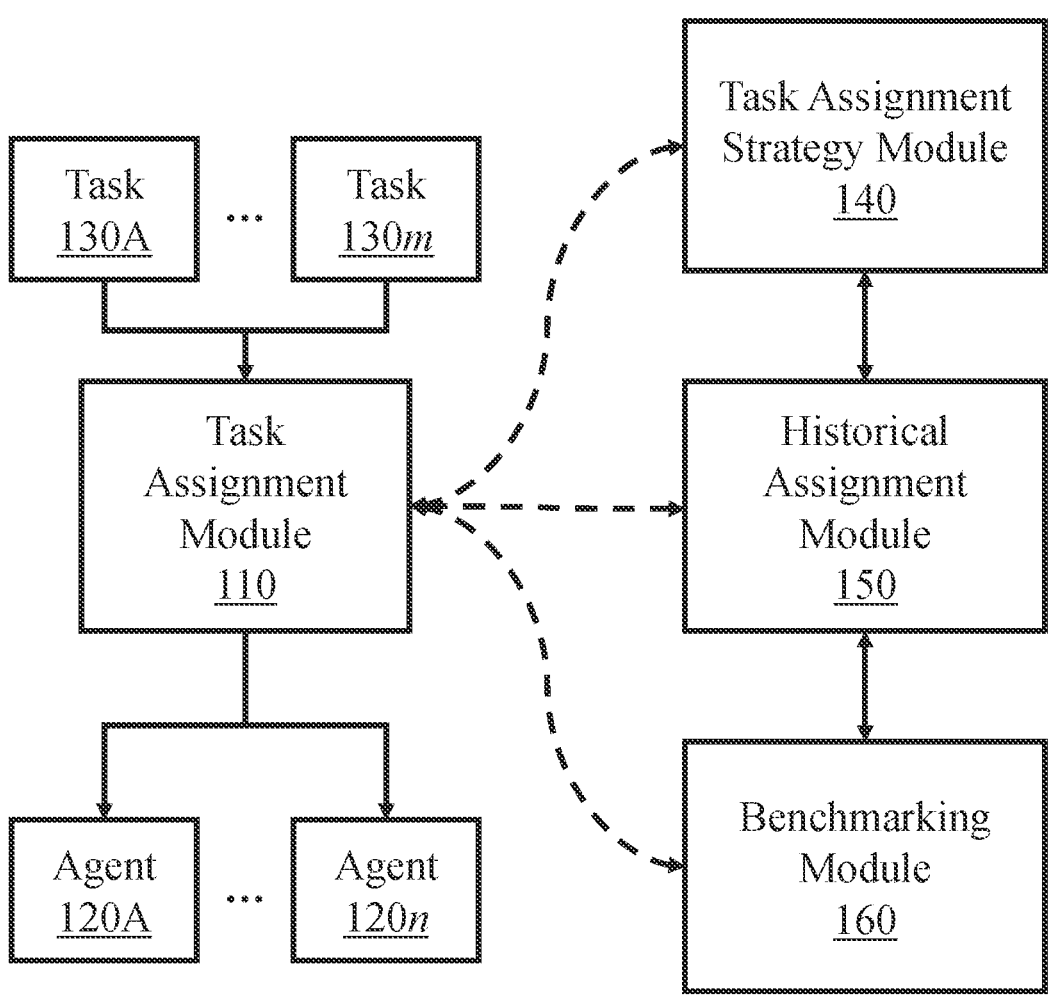
FIG. 1 shows a block diagram of a task assignment system according to embodiments of the present disclosure.

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks will be assigned ahead of low-priority tasks. In some situations, some low-priority tasks may have a high average waiting time while high-priority tasks are handled instead. Moreover, agents that might have handled low-priority tasks more efficiently may end up being assigned to high-priority tasks instead, leading to suboptimal overall performance in the task assignment system.

In view of the foregoing, it may be understood that there may be a need for a system that efficiently optimizes the application of a BP strategy in L2 environments of a task assignment system.

FIG. 1 shows a block diagram of a task assignment system 100 according to embodiments of the present disclosure. The description herein describes network elements, computers, and/or components of a system and method for benchmarking pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment system 100 may include a task assignment module 110. The task assignment system 100 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130$m$. Each of the m tasks may be assigned to an agent of the task assignment system 100 for servicing or other types of task processing. In the example of FIG. 1, n agents are available during the given period, agents 120A-120$n$. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some embodiments, a task assignment strategy module 140 may be communicatively coupled to and/or configured to operate in the task assignment system 100. The task assignment strategy module 140 may implement one or more task assignment strategies (or "pairing strategies") for assigning individual tasks to individual agents (e.g., pairing contacts with contact center agents).

A variety of different task assignment strategies may be devised and implemented by the task assignment strategy module 140. In some embodiments, a first-in/first-out ("FIFO") strategy may be implemented in which, for example, the longest-waiting agent receives the next available task (in L1 environments) or the longest-waiting task is assigned to the next available task (in L2 environments). Other FIFO and FIFO-like strategies may make assignments without relying on information specific to individual tasks or individual agents.

In other embodiments, a performance-based routing (PBR) strategy may be used for prioritizing higher-performing agents for task assignment may be implemented. Under PBR, for example, the highest-performing agent among available agents receives the next available task. Other PBR and PBR-like strategies may make assignments using information about specific agents but without necessarily relying on information about specific tasks or agents.

In yet other embodiments, a behavioral pairing (BP) strategy may be used for optimally assigning tasks to agents using information about both specific tasks and specific agents. Various BP strategies may be used, such as a diagonal model BP strategy or a network flow BP strategy. These task assignment strategies and others are described in detail for the contact center context in, e.g., U.S. Pat. No. 9,300,802 and U.S. patent application Ser. No. 15/582,223, which are hereby incorporated by reference herein.

In some embodiments, a historical assignment module 150 may be communicatively coupled to and/or configured to operate in the task assignment system 100 via other modules such as the task assignment module 110 and/or the task assignment strategy module 140. The historical assignment module 150 may be responsible for various functions such as monitoring, storing, retrieving, and/or outputting information about agent task assignments that have already been made. For example, the historical assignment module 150 may monitor the task assignment module 110 to collect information about task assignments in a given period. Each record of a historical task assignment may include information such as an agent identifier, a task or task type identifier, outcome information, or a pairing strategy identifier (i.e., an identifier indicating whether a task assignment was made using a BP pairing strategy or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or similar computer processor-generate model based on a set of historical assignments for a period of time (e.g., the past week, the past month, the past year, etc.), which may be used by the task assignment strategy module 140 to make task assignment recommendations or instructions to the task assignment module 110. In other embodiments, the historical assignment module 150 may send historical assignment information to another module such as the task assignment strategy module 140 or the benchmarking module 160.

In some embodiments, a benchmarking module 160 may be communicatively coupled to and/or configured to operate in the task assignment system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. The techniques for benchmarking and other functionality performed by the benchmarking module 160 for various task assignment strategies and various contexts are described in later sections throughout the present disclosure. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 100 while it was optimized or otherwise configured to use one task assignment strategy instead of another.

In some task assignment systems, a relatively large number of tasks can build up in a queue while waiting for assignment to agents as they become available. For this highly simplified example, there are nine tasks waiting in queue. Three of the tasks are high-priority tasks: H1, H2, and H3; and six of the tasks are low-priority tasks: L1, L2, L3, L4, L5, and L6.

In some task assignment systems, the tasks of different priorities may be organized (within the system, or at least conceptually) in different priority queues:

High-Priority Queue: H1, H2, H3

Low-Priority Queue: L1, L2, L3, L4, L5, L6

In this example, each priority queue is chronologically ordered according to the arrival time for each task (e.g., contact or caller in a contact center system). H1 is the longest-waiting high-priority task, H3 is the shortest-waiting high-priority task, L1 is the longest-waiting low-priority task, L6 is the shortest-waiting low-priority task, etc. In some embodiments, one or more of the tasks may be a "virtual task." For example, in a call center context, a caller may request a callback and disconnect from the call center, but the caller's position and priority level is maintained in the queue.

In other task assignment systems, the tasks of different priorities may be intermingled (within the system, or at least conceptually) in a chronologically ordered queue, except that higher-priority tasks may be inserted in the queue ahead of lower-priority tasks:

Queue: H1, H2, H3, L1, L2, L3, LA4, L5, L6

In this example, even if L1 is the longest-waiting task among all nine tasks, the three high-priority tasks that arrived later in time have been inserted into the queue ahead of L1.

A typical FIFO strategy may operate by assigning all of the high-priority tasks prior to assigning any of the low-priority tasks, allowing low-priority tasks to wait in the queue indefinitely, even as agents become available that may be able to handle lower-priority tasks more efficiently than higher-priority tasks. This shortcoming may be especially pernicious if higher-priority contacts continue arriving at the task assignment system.

In some task assignment systems, a service level agreement (SLA) may be in place that puts limits on how long any one task should be expected to wait for assignment. Some examples of SLAs include a fixed time (e.g., 10 seconds, 30 seconds, 3 minutes, etc.); an estimated wait time (EWT) plus some fixed time (e.g., an EWT of 1 min. 45 sec. plus 30 seconds); and a multiplier of EWT (e.g., 150% of EWT, or $1.2*EWT$).

In these task assignment systems, a FIFO strategy may eventually assign some lower-priority tasks if the SLA is exceeded for that task (sometimes referred to a "blown SLA"). Nevertheless, low-priority tasks may still end up waiting in the queue for longer than average expected wait time, and agent assignments may still be made inefficiently.

In some embodiments, a more effective and efficient task assignment strategy is a BP strategy. Under a BP strategy, as many as all nine tasks may be considered for assignment when an agent becomes available. The BP strategy may still take the priority level of each task into account, but it may ultimately prefer to assign a lower-priority task ahead of a higher-priority task if information about the task and the available agent indicate that such a pairing is optimal for performance of the task assignment system and achieving a desired target task utilization or rate of assignment.

The extent to which a BP strategy may account for priority level is a spectrum. On one extreme end of the spectrum, a BP strategy may consider all tasks in queue (or all tasks in all priority queues), giving relatively little to no weight to each tasks' priority level:

Queue: T1, T2, T3, T4, T5, T6, T7, T8, T9

In this example, the BP strategy may be able to make efficient, optimal task assignments. However, one possible consequence of this strategy is that some high-priority tasks may end up waiting much longer than they would under a FIFO strategy as lower-priority tasks are assigned first Near the other end of the spectrum, a BP strategy may consider all tasks in queue for the highest-priority level:

High-Priority Queue: H1, H2, H3

In this example, the BP strategy may still be able to make more efficient, optimal task assignments than the FIFO strategy. Under the FIFO strategy, the tasks would be assigned in queue order: first H1, then H2, and finally H3, regardless of which agent becomes available, whereas the BP strategy would consider information about the three tasks and the agent to select the more efficient pairing, even though the assigned high-priority task may not be the longest-waiting high-priority task. However, one possible consequence of this strategy is that low-priority tasks may end up waiting just as long as they would under the FIFO strategy, and opportunities to pair agents with low-priority tasks efficiently would be missed.

In some embodiments, a hybrid approach may be used that gives some deference to task prioritization and waiting time while also timely handling at least some of the longer-waiting lower-priority tasks. Some of these embodiments may be referred to as "Front-N" or "Head-N" because it considers the first N tasks in a prioritized queue.

For example, if N=6, such a BP strategy will select among the first six tasks in queue:

Queue: H1, H2, H3, L1, L2, L3, L4, L5, L6

In this example, when an agent become available, the BP strategy may assign any of the three high-priority tasks or any of the three longest-waiting low-priority tasks.

In some embodiments, N may be a predetermined and/or fixed value. In other embodiments, N may be dynamically determined for each pairing. For example, the BP strategy may determine a size for N that represents an optimal amount or degree of choice (e.g., 3, 6, 10, 20, etc.). For another example, N may be a function of the number of tasks waiting in the queue (e.g., one-quarter, -third, -half, etc. of the number of tasks in the queue). For another example, N may be a function of the relative number tasks at different priority levels.

For another example, the BP strategy may consider up to i calls for is i≤N if it encounters an i-th call for which the SLA has already been blown. In this example, if L1 has already been waiting for longer than the SLA expects, the BP strategy may consider H1, H2, H3, and L1—disregarding L2 and L3 because it will prefer to pair the longer-waiting L1 before pairing L2 or L3.

In some embodiments, the BP strategy may use a SLA based on tracking how many times an individual task has been up for selection (i.e., how many times a task has appeared in the Front-N tasks):

1. H1(1), H2(1), H3(1), L1(1), L2(1), L3(1)=>H3 selected
2. H1(2), H2(2), L1(2), L2(2), L3(2), L4(1)=>L2 selected
3. H1(3), H2(3), L1(3), L3(3), L4(3), L5(1)=>H1 selected
4. H2(4), L1(4), L3(4), L5(2), L6(1)

If the SLA is based on whether a task has appeared in the Front-6 more than three times, there are now three tasks with blown SLAs by the fourth assignment: H2, L1, and L3 have now appeared for a fourth time. In these embodiments, the BP strategy may preferably pair these three tasks ahead of other tasks that have appeared in the Front-6 only three or fewer times (i.e., L5 and L6).

In some embodiments, the SLA based on Front-N may be a function of N. For example, a task may appear in the Front-N up to ½ N, 2N, 5N, etc. before the SLA is blown.

This type of SLA may be especially useful in real-world scenarios in which higher-priority tasks continue to arrive at the queue and would otherwise be assigned ahead of longer-waiting lower-priority tasks that have already appeared in the Front-N more than the Front-N SLA would normally expect or allow.

In some embodiments, individual tasks or types of tasks may have different SLAs from other tasks or other types of tasks. The different SLAs may be based on any of the techniques described above, such as time-based SLAs or SLAs based on the number of times an individual task has been included in the Front-N or otherwise evaluated. For example, the first task in the queue may have a SLA of 2N, whereas the second task in the queue may have a SLA of 3N. The determination of which SLA an individual task has may be based on information about the task, information about the available agent or agents, or both.

In some embodiments, the SLA for a task may be dynamic, changing as the amount of waiting time increases or the number of times the task has been evaluated in the Front-N increases.

FIG. 2 shows a task assignment method 200 according to embodiments of the present disclosure.

Task assignment method 200 may begin at block 210. At block 210, a number of tasks for a size of a plurality of tasks may be determined. In some embodiments, the number of tasks for the size of the plurality of tasks may be equivalent to a size of a queue of tasks. For example, in a contact center context, if twenty contacts are waiting in a queue for connection to an agent, the plurality of tasks would include all twenty contacts from the queue. In other embodiments, the number of tasks may be a fixed or predetermined number of tasks take from the front or head of the queue. For example, if the number of tasks is ten, the plurality of tasks may include the first ten tasks (e.g., contacts) from the queue of size twenty. In other embodiments, the number of tasks may be dynamically determined according to any of the techniques described above, such as a function (e.g., fraction, percentage, proportion) of the size of the queue, a function of a relative number of tasks for different priority levels, a function of a degree of choice for a behavioral pairing strategy, etc. In some embodiments, this number of tasks may be referred to as "N" and the plurality of tasks may be referred to as the "Front-N" plurality of tasks.

Task assignment method 200 may proceed to block 220. At block 220, a priority may be determined for each of the plurality of tasks (e.g., the Front-N tasks). For example, a first portion of the plurality of tasks may be designated as "high priority," and a second portion of the plurality of tasks may be designated as "low priority." In some embodiments, there may be an arbitrarily large number of different priorities and identifiers for priorities. In some embodiments, the task assignment system may maintain separate queues of tasks for each priority. In other embodiments, the task assignment system may maintain a single queue of tasks ordered first by priority and, in some cases, second by order of arrival time or another chronological ordering. In these embodiments, task assignment method 200 may consider all tasks or the Front-N tasks regardless of whether the tasks are maintained in a single prioritized queue or multiple priority queues.

Task assignment method 200 may proceed to block 230. In some embodiments, whether a SLA has been exceeded for at least one task of the plurality of tasks may be determined.

In some embodiments, the task assignment strategy or the task assignment system will assign an agent to a task that has exceeded its SLA (e.g., the longest-waiting task with an exceeded or blown SLA). In various embodiments, the SLA may be defined or otherwise determined according to the any of the techniques described above, such as a fixed time, a function of EWT, or a function of the number of times a given task has been available for assignment in the Front-N. In other embodiments, there may be no SLA relevant to the task assignment strategy, and the task assignment method 200 may proceed without determining or otherwise checking for any exceeded SLAs.

Task assignment method 200 may proceed to block 240. At block 240, an agent may be determined that is available for assignment to any of the plurality of tasks. For example, in L2 environments, an agent becomes available for assignment. In other environments, such as L3 environments, multiple agents may be available for assignment.

Task assignment method 200 may proceed to block 250. At block 250, a task of the plurality of tasks may be assigned to the agent using the task assignment strategy. For example, if the task assignment strategy is a BP strategy, the BP strategy may consider information about each of the plurality of tasks and information about the agent to determine which task assignment is expected to optimize overall performance of the task assignment system. In some instances, the optimal assignment may be the longest-waiting, highest-priority task, as would be the case for a FIFO or PBR strategy. However, in other instances, the optimal assignment may be a longer-waiting and/or lower-priority task. Even if these instances, a lower expected performance for the instant pairing may be expected to lead to a higher overall performance of the task assignment system while also, in some embodiments, achieving a balanced or otherwise targeted task utilization (e.g., normalizing or balancing average waiting time for all tasks, or balancing average waiting time for all tasks within the same priority level).

In some embodiments, the task assignment strategy or the task assignment system may prioritize assigning a task with an exceeded SLA (such as a longest-waiting and/or highest-priority task with an exceeded SLA) if there is one.

In some embodiments, the task assignment system may cycle among multiple task assignment strategies (e.g., cycling between a BP strategy and FIFO or a PBR strategy). In some of these embodiments, the task assignment system may benchmark the relative performance of the multiple task assignment strategies.

After assigning the task to the agent, ask assignment method 200 may end.

At this point it should be noted that TK in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with TK in accordance with the present disclosure as described above. Alternatively, one or more processors operating in accordance with instructions may implement the functions associated with TK in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method performed by a contact center system, the contact center system comprising at least one computer processor, the method comprising:
   (i) determining, by said at least one computer processor, a set of contacts that are waiting to be paired with agents, wherein the number of contacts included in the set is M;
   (ii) dynamically determining, by said at least one computer processor, an integer N, wherein N is greater than 1 and is less than M;
   (iii) based on N, establishing, by said at least one computer processor, a subset of the set of M contacts that are waiting to be paired with an agent, wherein the number of contacts included in the subset of the set of M contacts is S, where S is greater than or equal to 1 and less than or equal to N;
   (iv) after establishing the subset of S contacts, applying, by said at least one computer processor, a pairing strategy to the established subset of S contacts waiting to be paired with an agent, wherein applying the pairing strategy to the established subset of S contacts results in at least a first contact from the established subset of S contacts being selected to pair with a first agent; and
   (v) as a result of selecting the first contact, pairing the selected first contact with the first agent, wherein establishing the subset of S contacts comprises:
      establishing an initial subset of N contacts; and
      based on a threshold time period, removing a contact from the initial subset of N contacts, thereby forming the subset of S contacts.

2. The method of claim 1, wherein the integer N is dynamically determined based on:
   M, and/or
   a number of contacts within the set that have a first priority.

3. The method of claim 1, wherein
   the threshold time period is a service level agreement (SLA) period, and
   the contact is removed from the initial subset of contacts based at least on determining that the contact has been waiting less than the SLA period.

4. The method of claim 1, wherein:
   the method further comprises, prior to applying the pairing strategy to the subset of contacts:

obtaining a value indicating a number of times that the first contact was included in a group of contacts to which the pairing strategy was applied; and based on the obtained value, changing the likelihood of selecting the first contact with an agent as a result of applying the pairing strategy.

5. The method of claim 1, wherein the contacts included in the set are arranged in an order based on a priority given to each of one or more contacts included in the set and the length of a waiting time of each of one or more contacts included in the set.

6. The method of claim 1, wherein the integer N is different from a number of agents available for pairing at the time of applying the pairing strategy.

7. The method of claim 1, wherein increasing a value of the integer N decreases a likelihood of the pairing strategy selecting a longest-waiting contact within the set of contacts.

8. The method of claim 1, wherein the first contact is assigned a first priority, the subset of contacts further includes a second contact having a second priority, the second priority is higher than the first priority, and applying the pairing strategy to the subset of contacts results in pairing the first contact having the first priority before the second contact having the second priority.

9. The method of claim 1, wherein S is greater than or equal to 2 and less than or equal to N.

10. A contact center system comprising:

at least one computer processor, wherein said at least one computer processor is configured to perform a method comprising:

(i) determining a set of contacts that are waiting to be paired with agents, wherein the number of contacts included in the set is M;

(ii) dynamically determining an integer N, wherein N is greater than 1 and is less than M;

(iii) based on N, establishing a subset of the set of M contacts that are waiting to be paired with an agent, wherein the number of contacts included in the subset of the set of M contacts is S, where S is greater than or equal to 1 and less than or equal to N;

(iv) after establishing the subset of S contacts, applying a pairing strategy to the established subset of S contacts waiting to be paired with an agent, wherein applying the pairing strategy to the established subset of S contacts results in at least a first contact from the subset of S contacts being selected to pair with a first agent; and (v) as a result of selecting the first contact, pairing the selected first contact with the first agent, wherein establishing the subset of S contacts comprises:

establishing an initial subset of N contacts; and based on a threshold time period, removing a contact from the initial subset of N contacts, thereby forming the subset of S contacts.

11. The contact center system of claim 10, wherein the integer N is dynamically determined based on:

M, and/or a number of contacts within the set that have a first priority.

12. The contact center system of claim 10, wherein the threshold time period is a service level agreement (SLA) period, and said one or more contacts are removed from the initial subset of contacts based at least on determining that said one or more contacts have been waiting less than the SLA period.

13. The contact center system of claim 10, wherein:

the subset of contacts comprises a first contact, and the method further comprises, prior to applying the pairing strategy to the subset of contacts:

obtaining a value indicating a number of times that the first contact was included in a group of contacts to which the pairing strategy was applied; and based on the obtained value, changing the likelihood of pairing the first contact with an agent.

14. The contact center system of claim 10, wherein the contacts included in the set are arranged in an order based on a priority given to each of one or more contacts included in the set and the length of a waiting time of each of one or more contacts included in the set.

15. The contact center system of claim 10, wherein the integer N is different from a number of agents available for pairing at the time of applying the pairing strategy.

16. The contact center system of claim 10, wherein increasing a value of the integer N decreases a likelihood of the pairing strategy selecting a longest-waiting contact within the set of contacts.

17. The contact center system of claim 10, wherein the subset of contacts includes at least a first contact having a first priority and a second contact having a second priority, the second priority is higher than the first priority, and applying the pairing strategy to the subset of contacts results in pairing the first contact having the first priority before the second contact having the second priority.

18. An article of manufacture comprising:

a non-transitory computer processor readable medium; and instructions stored on the medium, wherein the instructions are configured to be readable from the medium by at least one computer processor in a contact center system and thereby cause said at least one computer processor to operate so as to perform a method comprising:

(i) determining a set of contacts that are waiting to be paired with agents, wherein the number of contacts included in the set is M;

(ii) dynamically determining an integer N, wherein N is greater than 1 and is less than M;

(iii) based on N, establishing, by said at least one computer processor, a subset of the set of M contacts that are waiting to be paired with an agent, wherein the number of contacts included in the subset of the set of M contacts is S, where S is greater than or equal to 1 and less than or equal to N;

(iv) after establishing the subset of S contacts, applying, by said at least one computer processor, a pairing strategy to the established subset of S contacts waiting to be paired with an agent, wherein applying the pairing strategy to the established subset of S contacts results in at least a first contact from the subset of S contacts being selected to pair with a first agent; and (v) as a result of selecting the first contact, pairing the selected first contact with the first agent, wherein establishing the subset of S contacts comprises:

establishing an initial subset of N contacts; and based on a threshold time period, removing a contact from the initial subset of N contacts, thereby forming the subset of S contacts.

\* \* \* \* \*